(12) United States Patent
Lin et al.

(10) Patent No.: US 12,423,347 B2
(45) Date of Patent: Sep. 23, 2025

(54) METHOD FOR PROCESSING DATA VISUALIZATION CHART, ELECTRONIC DEVICE AND STORAGE MEDIUM

(71) Applicant: Beijing Volcano Engine Technology Co., Ltd., Beijing (CN)

(72) Inventors: Yong Lin, Beijing (CN); Ying Chen, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/971,582

(22) Filed: Dec. 6, 2024

(65) Prior Publication Data
US 2025/0190487 A1    Jun. 12, 2025

(30) Foreign Application Priority Data
Dec. 8, 2023 (CN) .......................... 202311684638.7

(51) Int. Cl.
*G06F 16/54* (2019.01)
*G06F 16/25* (2019.01)
*G06F 16/56* (2019.01)

(52) U.S. Cl.
CPC ............ *G06F 16/54* (2019.01); *G06F 16/258* (2019.01); *G06F 16/56* (2019.01)

(58) Field of Classification Search
CPC ......... G06F 16/54; G06F 16/258; G06F 16/56
See application file for complete search history.

(56) References Cited

U.S. PATENT DOCUMENTS

2023/0418510 A1* 12/2023 Chen ..................... G06F 3/0604

FOREIGN PATENT DOCUMENTS

| CN | 114706571 B | 9/2022 |
|---|---|---|
| CN | 115098088 A | 9/2022 |

OTHER PUBLICATIONS

Zhao et al. IEEE Transactions on Visualization and Computer Graphics, vol. 28, No. 3, Mar. 2022, pp. 1500-1513. (Year: 2022).*
Huang et al., Locating Charts from Scanned Document Pages, Ninth International Conference on Document Analysis and Recognition (ICDAR 2007), pp. 1-8 (Year: 2007).*

(Continued)

*Primary Examiner* — Cheyne D Ly
(74) *Attorney, Agent, or Firm* — Alleman Hall & Tuttle LLP

(57) ABSTRACT

The present disclosure discloses a method for processing a data visualization chart, an electronic device and a storage medium. And the method for processing a data visualization chart includes: obtaining a to-be-processed data visualization chart in a picture format, and determining a first feature vector corresponding to the to-be-processed data visualization chart, wherein the first feature vector is the same as a feature vector of a declarative grammar corresponding to the to-be-processed data visualization chart. Further, a second feature vector having a matching degree with the first feature vector greater than a first threshold is determined from a vector database, where the vector database includes a plurality of feature vectors and a declarative grammar corresponding to each feature vector. A declarative grammar corresponding to the to-be-processed data visualization chart is determined based on the declarative grammar corresponding to the second feature vector.

17 Claims, 6 Drawing Sheets

(56) References Cited

OTHER PUBLICATIONS

Chang, H. et al., "Muse: Text-to-Image Generation via Masked Generative Transformers," Proceedings of the 40th International Conference on Machine Learning (ICML 2023), Jul. 23, 2023, Honolulu, HI, 22 pages.

Dosovitskiy, A. et al., "An Image is Worth 16x16 Words: Transformers for Image Recognition at Scale," Proceedings of the Ninth International Conference on Learning Representations (ICLR 2021), May 3, 2021, Virtual, 22 pages.

Gao, J. et al., "VIEW: Visual information extraction widget for improving chart images accessibility," Proceedings of the 2012 IEEE International Conference on Image Processing (ICIP 2012), Sep. 30, 2012, Orlando, FL, 4 pages.

Huang, W. et al., "Model-Based Chart Image Recognition," Proceedings of Graphics Recognition, Recent Advances and Perspectives, 5th International Workshop (GREC 2003), Jul. 31, 2003, Barcelona, Spain, 13 pages.

Jung, D. et al., "ChartSense: Interactive Data Extraction from Chart Images," Proceedings of the 2017 CHI Conference on Human Factors in Computing Systems (CHI 2017), May 6, 2017, Denver, CO, 12 pages.

Krizhevsky, A., et al., "ImageNet Classification with Deep Convolutional Neural Networks," Communications of the ACM, vol. 60, No. 6, Jun. 2017, 7 pages.

Liu, R. et al., "Extraction of Vectorized Graphical Information from Scientific Chart Images," Proceedings of the Ninth International Conference on Document Analysis and Recognition (ICDAR 2007), Sep. 23, 2007, Paraná, Brazil, 5 pages.

Openai, "CLIP," Github, Available Online at https://github.com/openai/CLIP, Version of Jun. 4, 2024, 5 pages.

Radford, A. et al., "Learning Transferable Visual Models From Natural Language Supervision," Proceedings of the 38th International Conference on Machine Learning (ICML 2021), Jul. 18, 2021, Virtual, 48 pages.

Shao, M. et al., "Recognition and Classification of Figures in PDF Documents," Proceedings of Graphics Recognition, Ten Years Review and Future Perspectives, 6th International Workshop (GREC 2005), Jul. 18, 2021, Hong Kong, 12 pages.

Wang, J. et al., "GIT: A Generative Image-to-text Transformer for Vision and Language," Transactions on Machine Learning Research, vol. 2022, Nov. 2022, 49 pages.

\* cited by examiner

METHOD FOR PROCESSING DATA VISUALIZATION CHART, ELECTRONIC DEVICE AND STORAGE MEDIUM

CROSS-REFERENCE TO RELATED APPLICATION

The present application claims the priority and benefits of Chinese Patent Application No. 202311684638.7, filed on Dec. 8, 2023, which is incorporated herein by reference in its entirety as part of the present application.

TECHNICAL FIELD

The present disclosure relates to a method for processing a data visualization chart, an electronic device and a storage medium.

BACKGROUND

A data visualization chart can convert abstract chart data into an intuitive chart, so that a user can understand the chart data easily.

A data visualization chart stored in a picture format can be used to display the data visualization chart in the picture format, for example, display the data visualization chart in the form of a picture in a document. However, the data visualization chart stored in the picture format cannot support other more abundant processing operations. For example, when chart data changes, the data visualization chart stored in the current picture format cannot be modified, and a chart needs to be redrawn with a chart drawing tool. For another example, when semantic analysis is performed on the foregoing document, semantic analysis cannot be performed on the data visualization chart displayed in the picture format.

SUMMARY

Embodiments of the present disclosure provide a method and an apparatus for processing a data visualization chart, an electronic device and a storage medium.

An embodiment of the present disclosure provides a method for processing a data visualization chart, and the method includes:

obtaining a to-be-processed data visualization chart in a picture format;

determining a first feature vector of the to-be-processed data visualization chart, in which the first feature vector is the same as a feature vector of a declarative grammar corresponding to the to-be-processed data visualization chart;

determining, from a vector database, a second feature vector having a matching degree with the first feature vector greater than a first threshold, the vector database including: a plurality of feature vectors and a declarative grammar respectively corresponding to each of the plurality of feature vectors, the plurality of feature vectors including the second feature vector; and determining, based on the declarative grammar corresponding to the second feature vector in the vector database, a declarative grammar corresponding to the to-be-processed data visualization chart.

Optionally, the vector database is constructed by:

obtaining historical data visualization charts and a declarative grammar corresponding to each of the historical data visualization charts, the historical data visualization charts being in a picture format; and performing the following operations for any one of the plurality of historical data visualization charts:

determining a feature vector of the declarative grammar corresponding to the historical data visualization chart; and storing the declarative grammar corresponding to the historical data visualization chart and the feature vector of the declarative grammar corresponding to the historical data visualization chart in the vector database in a corresponding manner.

Optionally, the determining a feature vector of the declarative grammar corresponding to the historical data visualization chart includes:

extracting key information from the declarative grammar corresponding to the historical data visualization chart to obtain a simplified declarative grammar, the simplified declarative grammar being a structured declarative grammar; and converting the simplified declarative grammar into a declarative grammar in a string format, and obtaining the feature vector of the declarative grammar corresponding to the historical data visualization chart based on the declarative grammar in the string format.

Optionally, the key information includes:

chart type information of the historical data visualization chart or chart data information of the historical data visualization chart.

Optionally, the determining a first feature vector of the to-be-processed data visualization chart includes:

inputting the to-be-processed data visualization chart into a chart processing model to obtain the first feature vector, in which the chart processing model is configured to determine, according to a data visualization chart that is input, a feature vector corresponding to the data visualization chart, and the chart processing model is obtained through training by:

performing the following operations for any one of the plurality of historical data visualization charts:

using a feature vector of a declarative grammar corresponding to the historical data visualization chart as a label of the historical data visualization chart, and training the chart processing model by using the historical data visualization chart and the label of the historical data visualization chart, in which: the label of the historical data visualization chart is used to indicate the feature vector of the historical data visualization chart.

Optionally, the training the chart processing model by using the historical data visualization chart and the label of the historical data visualization chart includes:

fine-tuning a pre-trained model by using the historical data visualization chart and the label of the historical data visualization chart, in which the pre-trained model has a capability of understanding semantic connections between pictures and picture descriptions.

Optionally, the determining, from a vector database, a second feature vector with a matching degree with the first feature vector greater than a first threshold includes:

determining at least one second feature vector matching the first feature vector from the vector database; and the determining, based on the declarative grammar corresponding to the second feature vector in the vector database, a declarative grammar corresponding to the to-be-processed data visualization chart includes:

determining, as the declarative grammar corresponding to the to-be-processed data visualization chart, a declarative grammar corresponding to a target feature vector in the vector database, in which: the target feature vector is top N second feature vectors after the at least one second feature vector is sorted in a descending order of a matching degree with the first feature vector, and N is a positive integer.

An embodiment of the present disclosure provides an apparatus for processing a data visualization chart, and the apparatus includes:

an obtaining unit, configured to obtain a to-be-processed data visualization chart in a picture format;

a first determining unit, configured to determine a first feature vector of the to-be-processed data visualization chart, the first feature vector being the same as a feature vector of a declarative grammar corresponding to the to-be-processed data visualization chart;

a second determining unit, configured to determine, from a vector database, a second feature vector with a matching degree with the first feature vector greater than a first threshold, the vector database including: a plurality of feature vectors and a declarative grammar respectively corresponding to each of the plurality of feature vectors, the plurality of feature vectors including the second feature vector; and a third determining unit, configured to determine, based on the declarative grammar corresponding to the second feature vector in the vector database, a declarative grammar corresponding to the to-be-processed data visualization chart.

Optionally, the vector database is constructed by:

obtaining historical data visualization charts and a declarative grammar corresponding to each of the historical data visualization charts, the historical data visualization charts being in a picture format; and performing the following operations for any one of the plurality of historical data visualization charts:

determining a feature vector of the declarative grammar corresponding to the historical data visualization chart; and storing the declarative grammar corresponding to the historical data visualization chart and the feature vector of the declarative grammar corresponding to the historical data visualization chart in the vector database in a corresponding manner.

Optionally, the determining a feature vector of the declarative grammar corresponding to the historical data visualization chart includes:

extracting key information from the declarative grammar corresponding to the historical data visualization chart to obtain a simplified declarative grammar, the simplified declarative grammar being a structured declarative grammar; and converting the simplified declarative grammar into a declarative grammar in a string format, and obtaining the feature vector of the declarative grammar corresponding to the historical data visualization chart based on the declarative grammar in the string format.

Optionally, the key information includes:

other information except for chart interaction information, the chart interaction information being information displayed in response to an interaction operation triggered for a data visualization chart.

Optionally, the first determining unit is configured to:
input the to-be-processed data visualization chart into a chart processing model to obtain the first feature vector, in which the chart processing model is configured to determine, according to a data visualization chart that is input, a feature vector corresponding to the data visualization chart, and the chart processing model is obtained through training by:

performing the following operations for any one of the plurality of historical data visualization charts:

using a feature vector of a declarative grammar corresponding to the historical data visualization chart as a label of the historical data visualization chart, and training the chart processing model by using the historical data visualization chart and the label of the historical data visualization chart, in which: the label of the historical data visualization chart is used to indicate the feature vector of the historical data visualization chart.

Optionally, the training the chart processing model by using the historical data visualization chart and the label of the historical data visualization chart includes:

fine-tuning a pre-trained model by using the historical data visualization chart and the label of the historical data visualization chart, in which the pre-trained model has a capability of understanding semantic connections between pictures and picture descriptions.

Optionally, the second determining unit is configured to:
determine at least one second feature vector matching the first feature vector from the vector database; and the determining, based on the declarative grammar corresponding to the second feature vector in the vector database, a declarative grammar corresponding to the to-be-processed data visualization chart includes:

determining, as the declarative grammar corresponding to the to-be-processed data visualization chart, a declarative grammar corresponding to a target feature vector in the vector database, in which: the target feature vector is top N second feature vectors after the at least one second feature vector is sorted in a descending order of a matching degree with the first feature vector, and N is a positive integer.

An embodiment of the present disclosure provides an electronic device, and the device includes a processor and a memory, the processor is configured to execute instructions stored in the memory, to enable the device to perform the method described in any one of the above.

An embodiment of the present disclosure provides a computer-readable storage medium, and the computer-readable storage medium includes instructions, the instructions instructing a device to perform the method described in any one of the above.

An embodiment of the present disclosure provides a computer program product which, when running on a computer, causes the computer to perform the method described in any one of the above.

BRIEF DESCRIPTION OF DRAWINGS

In order to more clearly describe the technical solutions in the embodiments of the present disclosure, the following briefly describes the accompanying drawings used in the description of the embodiments. It is clear that the accompanying drawings in the following description show merely some embodiments of the present disclosure, and a person of ordinary skill in the art may still derive other drawings from these accompanying drawings without creative efforts.

DETAILED DESCRIPTION

In order that those skilled in the art better understand the solutions of the present disclosure, the technical solutions in the embodiments of the present disclosure will be described clearly and completely below with reference to the accompanying drawings in the embodiments of the present disclosure. It is obvious that the described embodiments are merely some but not all of the embodiments of the present disclosure. All other embodiments obtained by a person of ordinary skill in the art based on the embodiments of the present disclosure without creative efforts shall fall within the protection scope of the present disclosure.

The inventors of the present disclosure have found through research that a data visualization chart stored in a picture format cannot support other more abundant processing operations. For example, when chart data changes, the data visualization chart stored in the current picture format cannot be modified, and a chart needs to be redrawn with a chart drawing tool. For another example, when semantic analysis is performed on the foregoing document, semantic analysis cannot be performed on the data visualization chart displayed in the picture format.

When the data visualization chart stored in the picture format can be converted into a corresponding declarative grammar, when a related operation needs to be triggered for the data visualization chart, the declarative grammar is processed. For example, when the chart data changes, related data in the declarative grammar may be modified. For another example, when semantic analysis is performed on a document including a data visualization chart, semantic analysis may be performed on the declarative grammar corresponding to the data visualization chart.

Figure 1:
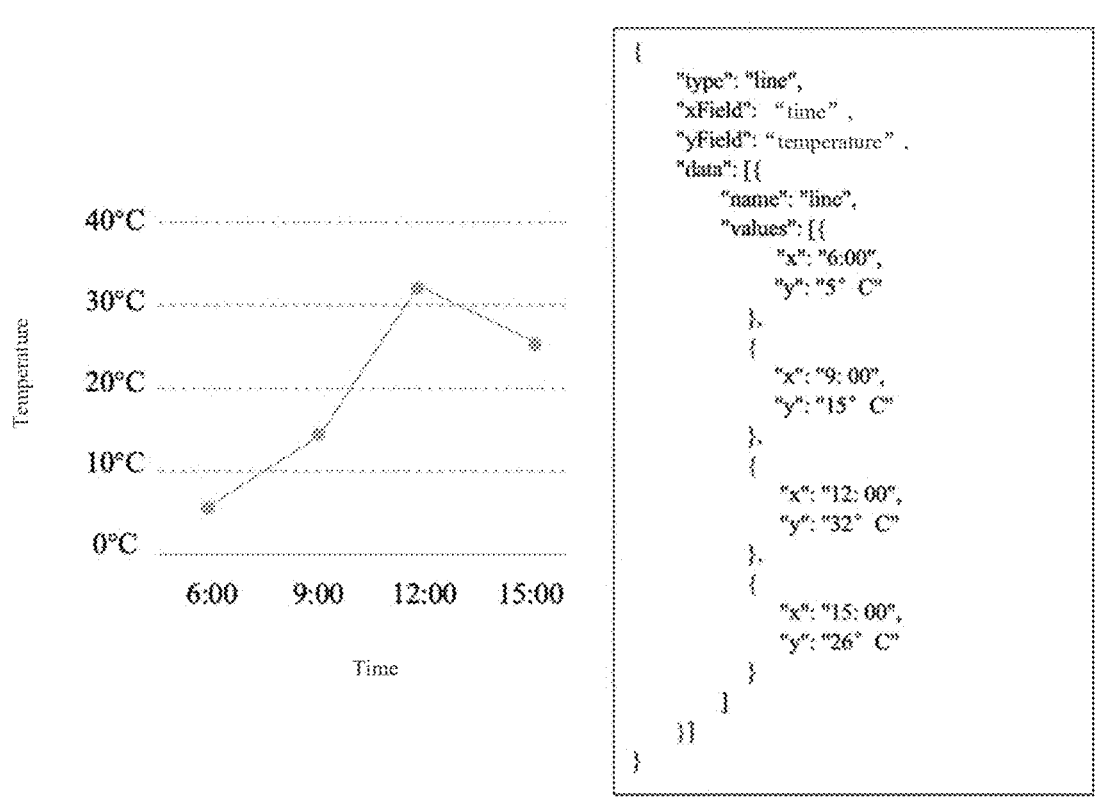
FIG. 1 is a schematic diagram of a data visualization chart and a corresponding declarative grammar according to an embodiment of the present disclosure.

For the declarative grammar corresponding to the data visualization chart, reference may be made to FIG. 1. FIG. 1 is a schematic diagram of a data visualization chart and a corresponding declarative grammar according to an embodiment of the present disclosure. The left side of FIG. 1 shows the data visualization chart, and the right side shows the declarative grammar corresponding to the data visualization chart.

How to determine the declarative grammar corresponding to the data visualization chart stored in the picture format is a problem to be solved at present.

In view of this, an embodiment of the present disclosure provides a method for processing a data visualization chart, and the method can determine a declarative grammar corresponding to a to-be-processed data visualization chart in a picture format.

Various non-limiting implementations of the present disclosure are described in detail below with reference to the accompanying drawings.

Figure 2:
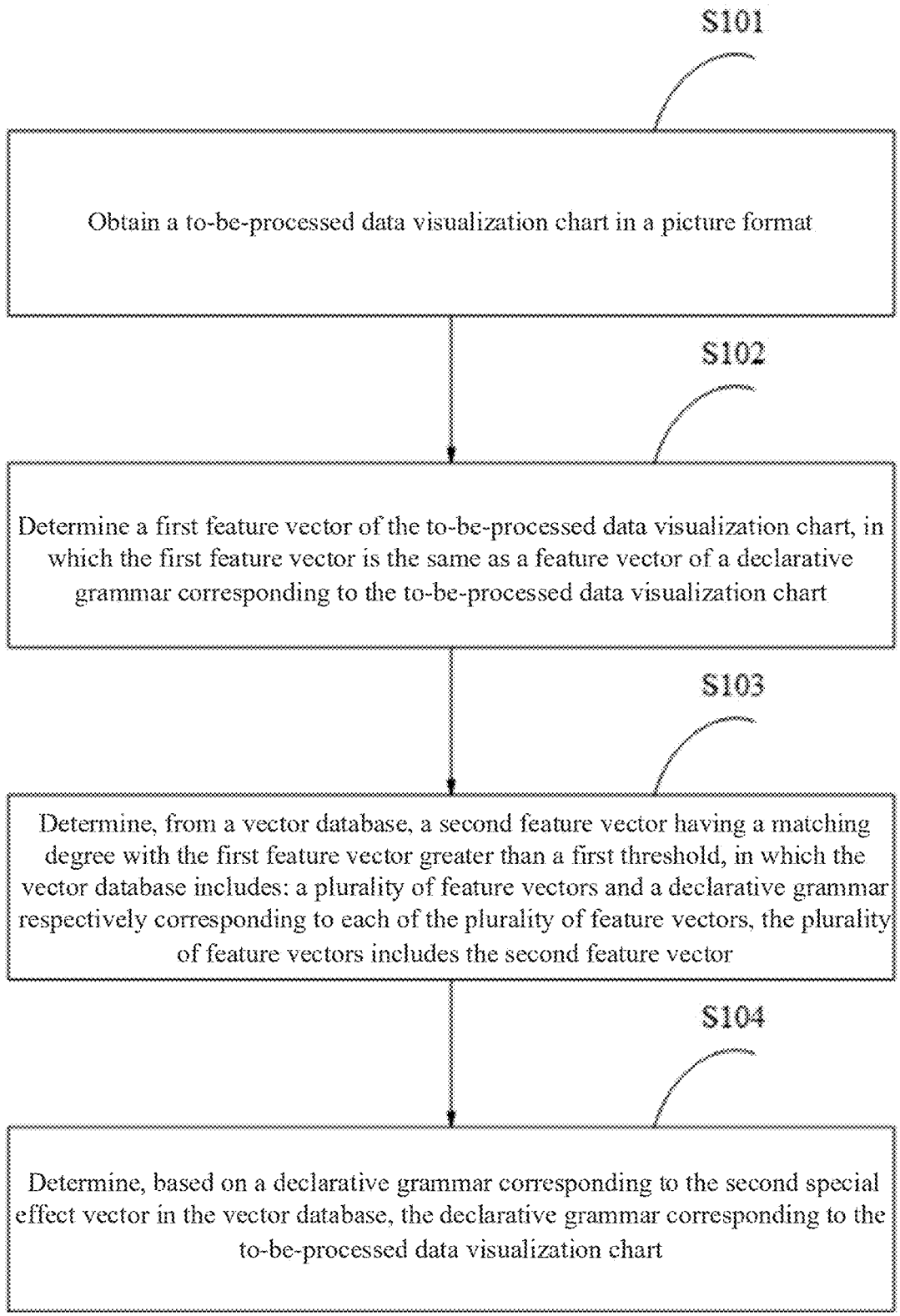
FIG. 2 is a schematic flowchart of a method for processing a data visualization chart according to an embodiment of the present disclosure.

Referring to FIG. 2, FIG. 2 is a schematic flowchart of a method for processing a data visualization chart according to an embodiment of the present disclosure. In this embodiment, the method may include, for example, the following steps S101 to S104.

S101: Obtain a to-be-processed data visualization chart in a picture format.

Channels for obtaining the to-be-processed data visualization chart in the picture format are not specifically limited in the embodiments of the present disclosure. In an example, the to-be-processed data visualization chart may be a data visualization chart included in a document. In this case, the to-be-processed data visualization chart may be obtained from the document. In another example, the to-be-processed data visualization chart may be a data visualization chart included in another channel, for example, a web page. In this case, the to-be-processed data visualization chart may be obtained from the web page.

S102: Determine a first feature vector of the to-be-processed data visualization chart, in which the first feature vector is the same as a feature vector of a declarative grammar corresponding to the to-be-processed data visualization chart.

After the to-be-processed data visualization chart is obtained, the to-be-processed data visualization chart may be further processed to obtain the first feature vector of the to-be-processed data visualization chart. In the embodiments of the present disclosure, the first special effect vector of the to-be-processed data visualization chart is the same as the feature vector of the declarative grammar corresponding to the to-be-processed data visualization chart. In other words, the first feature vector is not only a vector corresponding to the to-be-processed data visualization chart, but also a feature vector corresponding to the to-be-processed data visualization chart.

The embodiments of the present disclosure do not specifically limit a specific implementation of obtaining the first special effect vector based on the to-be-processed data visualization chart. In an example, a specific algorithm may be used to calculate the to-be-processed data visualization chart to obtain the first feature vector.

In another example, the to-be-processed data visualization chart may be processed by using a chart processing model to obtain the first feature vector. The chart processing model may obtain a feature vector corresponding to a data visualization chart according to a data visualization chart that is input in a picture format, and the feature vector may be used not only as a feature vector of the data visualization chart, but also as a feature vector of a declarative grammar corresponding to the data visualization chart. As a specific example, the to-be-processed data visualization chart in a picture format may be inputted into the chart processing model, and accordingly, the chart processing model may process the to-be-processed data visualization chart in the picture format and output the first feature vector.

The chart processing model may be obtained through training in advance. For a training manner of the chart processing model, reference may be made to the description of FIG. 4 below, which will not be described in detail here.

After the first feature vector is determined, the declarative grammar corresponding to the to-be-processed data visualization chart may be determined based on the vector database and the first feature vector. Specifically, the following S103 to S104 may be performed to determine the declarative grammar corresponding to the to-be-processed data visualization chart.

S103: Determine, from a vector database, a second feature vector having a matching degree with the first feature vector greater than a first threshold, in which the vector database includes: a plurality of feature vectors and a declarative grammar respectively corresponding to each of the plurality of feature vectors, the plurality of feature vectors includes the second feature vector.

S104: Determine, based on a declarative grammar corresponding to the second special effect vector in the vector database, the declarative grammar corresponding to the to-be-processed data visualization chart.

In the embodiments of the present disclosure, the vector database may include a plurality of feature vectors and a declarative grammar respectively corresponding to each of the feature vectors. As described above, the first feature vector is not only a feature vector of the to-be-processed data visualization chart, but also a feature vector of the declarative grammar corresponding to the to-be-processed data visualization chart. Therefore, the first feature vector may be matched with the feature vectors in the vector database to obtain a second feature vector having a matching degree with the first feature vector higher than a first threshold. It is not difficult to understand that the plurality of feature vectors includes the second feature vector.

In an example, a matching degree between two feature vectors may be measured by using vector similarity or a vector distance.

For any two feature vectors, a higher vector similarity between the two feature vectors indicates a higher matching degree between the two feature vectors. When the matching degree is measured by using the vector similarity, that a matching degree between the first feature vector and the second feature vector is greater than a first threshold may be that vector similarity between the first feature vector and the second feature vector is greater than a first threshold (for example, 0.8).

For any two feature vectors, a smaller vector distance between the two feature vectors indicates a higher matching degree between the two feature vectors. When the matching degree is measured by using the vector distance, that a matching degree between the first feature vector and the second feature vector is greater than a first threshold may be that a vector distance between the first feature vector and the second feature vector is less than a preset distance (for example, 0.8).

For a calculation manner of the vector similarity and the vector distance, the vector similarity and the vector distance may be calculated by using a conventional calculation manner, which will not be described in detail here.

Because the first feature vector is the feature vector of the declarative grammar corresponding to the to-be-processed data visualization chart, the determined second feature vector is the feature vector of the declarative grammar corresponding to the to-be-processed data visualization chart. Therefore, further, the declarative grammar corresponding to the to-be-processed data visualization chart may be determined based on the declarative grammar corresponding to the second feature vector in the vector database.

In the embodiments of the present disclosure, after the first feature vector is matched with the feature vectors included in the vector database, at least one second feature vector having a matching degree with the first feature vector greater than a first threshold may be obtained.

In an example, in a specific implementation of S104, the declarative grammar corresponding to each of the at least one second feature vector may be obtained from the vector database, and the declarative grammar corresponding to each of the at least one second feature vector is determined as the declarative grammar corresponding to the to-be-processed data visualization chart. In this way, a user can select one from the declarative grammars corresponding to the at least one second feature vector as a target declarative grammar corresponding to the to-be-processed data visualization chart.

In another example, in a specific implementation of S104, the at least one second feature vector may be sorted in descending order of a matching degree with the first feature vector, and top N second feature vectors are determined as target feature vectors. Further, the declarative grammar corresponding to the target feature vector is obtained from the vector database, and the declarative grammar corresponding to the target feature vector is determined as the declarative grammar corresponding to the to-be-processed data visualization chart.

In the embodiments of the present disclosure, N is a positive integer.

When N is 1, the target feature vector is a second feature vector with a highest matching degree with the first feature vector and with a matching degree with the first feature vector greater than a first threshold in the vector database.

When N is greater than 1, the target feature vector includes a plurality of second feature vectors with a matching degree with the first feature vector greater than a first threshold. In this case, after the declarative grammar corresponding to the target feature vector is determined as the declarative grammar corresponding to the to-be-processed data visualization chart, a user can select one declarative grammar from the declarative grammars corresponding to the plurality of second feature vectors as the target declarative grammar corresponding to the to-be-processed data visualization chart.

It can be learned from the foregoing description that with the solution of the embodiments of the present disclosure, the declarative grammar corresponding to the to-be-processed data visualization chart in the picture format can be determined. In this way, when a related operation needs to be triggered for the to-be-processed data visualization chart, the declarative grammar corresponding to the to-be-processed data visualization chart is processed.

In the embodiments of the present disclosure, the foregoing vector database may be constructed in advance. Next, a construction manner of the vector database is described.

Figure 3:
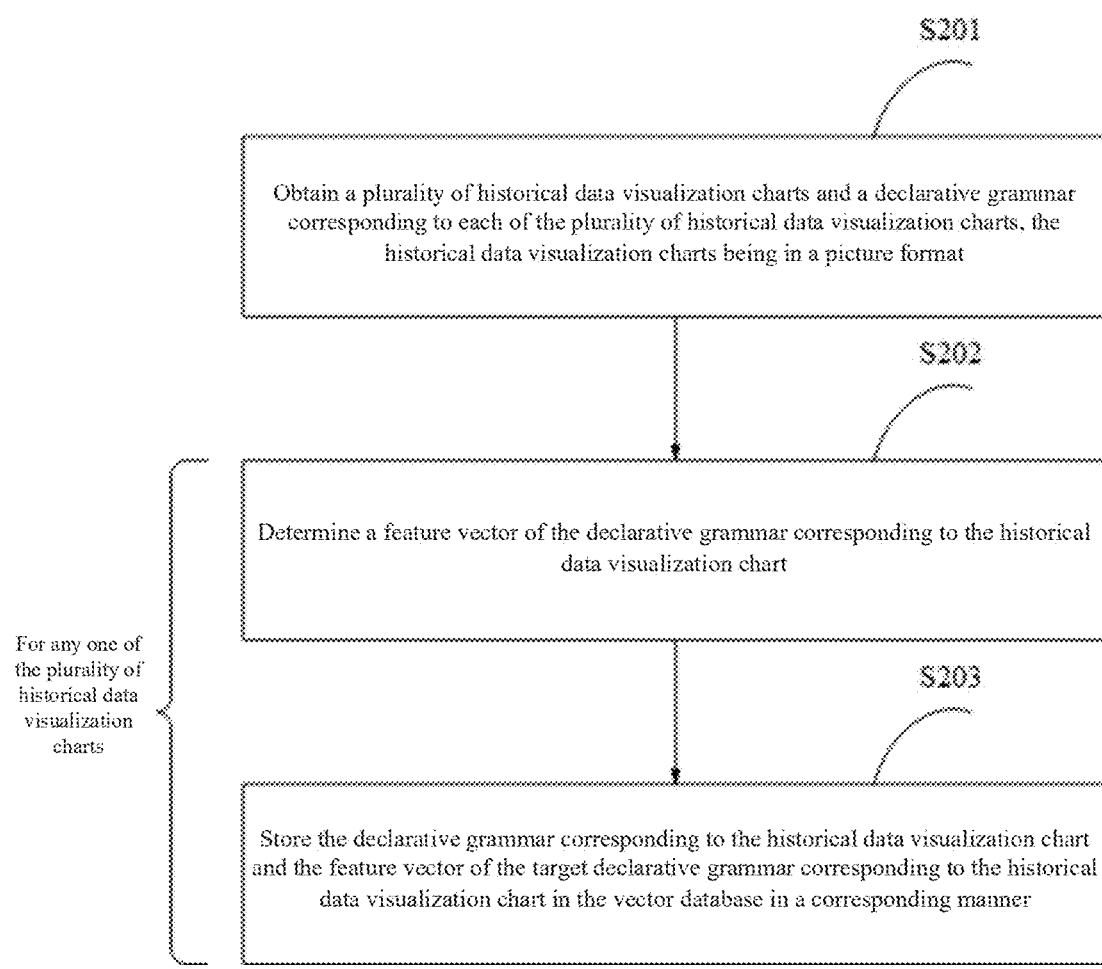
FIG. 3 is a schematic flowchart of a method for constructing a vector database according to an embodiment of the present disclosure.

Referring to FIG. 3, FIG. 3 is a schematic flowchart of a method for constructing a vector database according to an embodiment of the present disclosure. The method shown in FIG. 3 may include the following S201 to S203.

S201: Obtain a plurality of historical data visualization charts and a declarative grammar corresponding to each of the plurality of historical data visualization charts, the historical data visualization charts being in a picture format.

In an example, the plurality of historical data visualization charts and the declarative grammar corresponding to each of the plurality of historical data visualization charts may be obtained through a platform that provides data visualization charts in a picture format and feature vectors of the declarative grammar corresponding to the data visualization charts.

The embodiments of the present disclosure do not specifically limit the platform, and the platform may be any existing or future platform.

In the embodiments of the present disclosure, the declarative grammar corresponding to each historical data visualization chart is a structured declarative grammar shown on the right side of FIG. 1. The declarative grammar corresponding to the historical data visualization chart includes main information in the historical visualization chart, for example, a chart type, names corresponding to chart axes (a horizontal axis and a vertical axis), specific data, some style information, and the like.

In an example, to make the vector database more widely applicable, the plurality of historical data visualization charts may cover as many types of data visualization charts as possible. In addition, the number of data visualization charts of different types is kept as balanced as possible.

For any one of the plurality of historical data visualization charts, the following S202 to S203 are performed.

S202: Determine a feature vector of the declarative grammar corresponding to the historical data visualization chart.

In an example, the feature vector of the declarative grammar corresponding to the historical data visualization chart may be obtained by processing, by using a language model, the declarative grammar corresponding to the historical data visualization chart. For example, the declarative grammar corresponding to the historical data visualization chart may be inputted into the language model, and the language model processes the declarative grammar corresponding to the historical data visualization chart and outputs the feature vector of the declarative grammar corresponding to the historical data visualization chart.

In another example, S202 may be specifically implemented by including the following steps A1 and A2.

A1: Extract key information from the declarative grammar corresponding to the historical data visualization chart to obtain a simplified declarative grammar, the simplified declarative grammar being a structured declarative grammar.

In the embodiments of the present disclosure, the key information may be determined based on an actual requirement. For example, the key information may include chart type information of the historical data visualization chart or chart data information of the historical data visualization chart. In an example, considering that for the chart, important information is a chart type and chart data displayed in the chart. Chart interaction information is not very important. Therefore, in an example, the key information may include other information except for the chart interaction information. The chart interaction information mentioned here refers to information displayed in the data visualization chart in response to an interaction operation triggered by a user for the data visualization chart. The chart interaction information may be, for example, hover indication information, where the hover indication information refers to prompt information displayed after a user triggers a hover operation in a data visualization chart.

In the embodiments of the present disclosure, after the key information is extracted from the declarative grammar corresponding to the historical data visualization chart, the simplified declarative grammar may be obtained. It is not difficult to understand that the simplified declarative grammar is obtained by removing the foregoing chart interaction information from the declarative grammar corresponding to the historical data visualization chart. As described above, the declarative grammar corresponding to the historical data visualization chart is the structured declarative grammar. Correspondingly, the simplified declarative grammar is also the structured declarative grammar.

A2: Convert the simplified declarative grammar into a declarative grammar in a string format, and obtain the feature vector of the declarative grammar corresponding to the historical data visualization chart based on the declarative grammar in the string format.

After the simplified declarative grammar is obtained, the feature vector of the declarative grammar corresponding to the historical data visualization chart may be obtained based on the simplified declarative grammar. For example, the simplified declarative grammar may be inputted into a language model, and the language model processes the simplified declarative grammar and outputs the feature vector of the declarative grammar corresponding to the historical data visualization chart.

In an example, considering that for the structured declarative grammar, semantic information that can be reflected by the included structural information is very little, after the simplified declarative grammar is obtained, the simplified declarative grammar may be converted into the declarative grammar in the string format, where the declarative grammar in the string format can retain the semantic information in the foregoing structured declarative grammar. Specifically, each sub-structure in the simplified declarative grammar may be traversed, and information included in each sub-structure is converted into a sentence expressed in a natural language, to obtain the declarative grammar in the string format. For example: For a declarative grammar of a chart attribute, an attribute name is first extracted, then a data attribute value type (such as a value, text, or the like) is spliced, and finally a long text is obtained. It is not difficult to understand that the declarative grammar in the string format no longer includes the foregoing structural information.

After the declarative grammar in the string format is obtained, the feature vector of the declarative grammar corresponding to the historical data visualization chart may be obtained by using the declarative grammar in the string format. For example, the declarative grammar in the string format may be inputted into a language model, and the language model processes the declarative grammar in the string format and outputs the feature vector of the declarative grammar corresponding to the historical data visualization chart. Another advantage of this manner is that the declarative grammar in the string format is more easily understood by the language model than the structured declarative grammar.

S203: Store the declarative grammar corresponding to the historical data visualization chart and the feature vector of the target declarative grammar corresponding to the historical data visualization chart in the vector database in a corresponding manner.

After the feature vector of the target declarative grammar corresponding to the historical data visualization chart is determined, the declarative grammar corresponding to the historical data visualization chart and the feature vector of the target declarative grammar corresponding to the historical data visualization chart may be stored in the vector database in a corresponding manner.

After S202 to S203 are performed for any one of the plurality of historical data visualization charts, the vector database is obtained.

Figure 4:
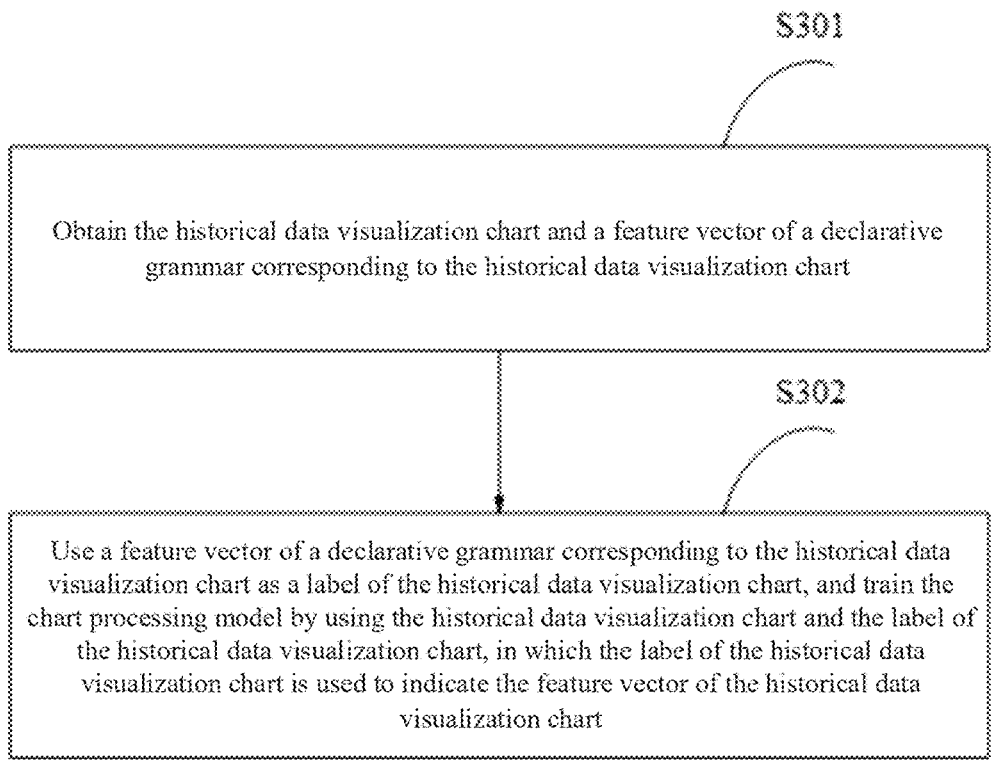
FIG. 4 is a schematic flowchart of a method for training a chart processing model according to an embodiment of the present disclosure.

As described above, the chart processing model may be obtained through training in advance. Next, with reference to FIG. 4, a training manner of the foregoing chart processing model is described. FIG. 4 is a schematic flowchart of a method for training a chart processing model according to an embodiment of the present disclosure. The method shown in FIG. 4 may include the following S301 to S302.

In the embodiments of the present disclosure, the following S301 to S302 may be performed for any one of the plurality of historical data visualization charts in S201.

S301: Obtain the historical data visualization chart and a feature vector of a declarative grammar corresponding to the historical data visualization chart.

For an obtaining manner of the historical data visualization chart, reference may be made to the related description in S201 above, which will not be repeated here.

The feature vector of the declarative grammar corresponding to the historical data visualization chart mentioned here may be the feature vector determined in S202.

S302: Use a feature vector of a declarative grammar corresponding to the historical data visualization chart as a label of the historical data visualization chart, and train the chart processing model by using the historical data visualization chart and the label of the historical data visualization chart, in which the label of the historical data visualization chart is used to indicate the feature vector of the historical data visualization chart.

In the embodiments of the present disclosure, in order that after the chart processing model processes the to-be-processed data visualization chart, the obtained first feature vector may be used not only as a feature vector of the to-be-processed data visualization chart, but also as a feature vector of a declarative grammar corresponding to the to-be-processed data visualization chart, when the chart processing model is trained, the feature vector of the declarative grammar corresponding to the historical data visualization chart may be used as the label of the historical data visualization chart, in which the label of the historical data visualization chart is used to indicate the feature vector of the historical data visualization chart, and then the chart processing model is trained by using the historical data visualization chart and the label of the historical data visualization chart.

It should be noted that training the chart processing model by using the historical data visualization chart and the label of the historical data visualization chart may be understood as updating a model parameter of the chart processing model by using the historical data visualization chart and the label of the historical data visualization chart. Specifically, the chart processing model may process the historical data visualization chart to obtain a corresponding prediction result, where the prediction result is a feature vector predicted by the current chart processing model for the historical data visualization chart. Then, a loss function is calculated based on the prediction result and the label, and further, the model parameter of the chart processing model is updated based on the loss function. When a value of the loss function is smaller, it indicates that the foregoing prediction result and the label are closer, and accordingly, it indicates that the prediction result is closer to the standard value.

In an example, the loss function may be a mean square error between the foregoing prediction result and the label. Reference may be made to formula (1).

$$\text{loss} = \frac{1}{n}\sum_{i=1}^{n}(a_i - b_i)^2 \quad \text{Formula (1)}$$

In formula (1):
loss is the loss function;

n is a number of historical data visualization charts used for training in a certain round of training;
$a_i$ is the label of the historical data visualization chart; and
$b_i$ is the prediction result obtained by the chart processing model processing the historical data visualization chart.

It can be learned from the foregoing description that when the chart processing model is trained, the feature vector of the declarative grammar corresponding to the historical data visualization chart is used as the standard value of the feature vector of the historical data visualization chart. In this way, after the parameter of the chart processing model is continuously adjusted, loss in formula (1) approaches 0, that is, $a_i$ and $b_i$ are almost the same. Therefore, for the finally obtained chart processing model, the first feature vector obtained by processing the to-be-processed data visualization chart may also be used as the feature vector of the declarative grammar corresponding to the to-be-processed data visualization chart.

In an example, the chart processing model may be trained based on a basic model that does not have any data processing capability.

In another example, in order to improve efficiency of obtaining the chart processing model through training, the chart processing model may also be obtained through training based on a pre-trained model. Specifically, the chart processing model may be obtained through training based on a pre-trained model with a capability of understanding semantic connections between pictures and picture descriptions. In a specific implementation of "obtaining the chart processing model through training based on the pre-trained model", the pre-trained model may be fine-tuned by using the historical data visualization chart and the label of the historical data visualization chart, to obtain the chart processing model. In a specific example, an additional network layer may be added to a rear layer of the pre-trained model, and the network layer is used to map a feature vector outputted by the pre-trained model to another vector space to obtain the foregoing prediction result.

Figure 5:
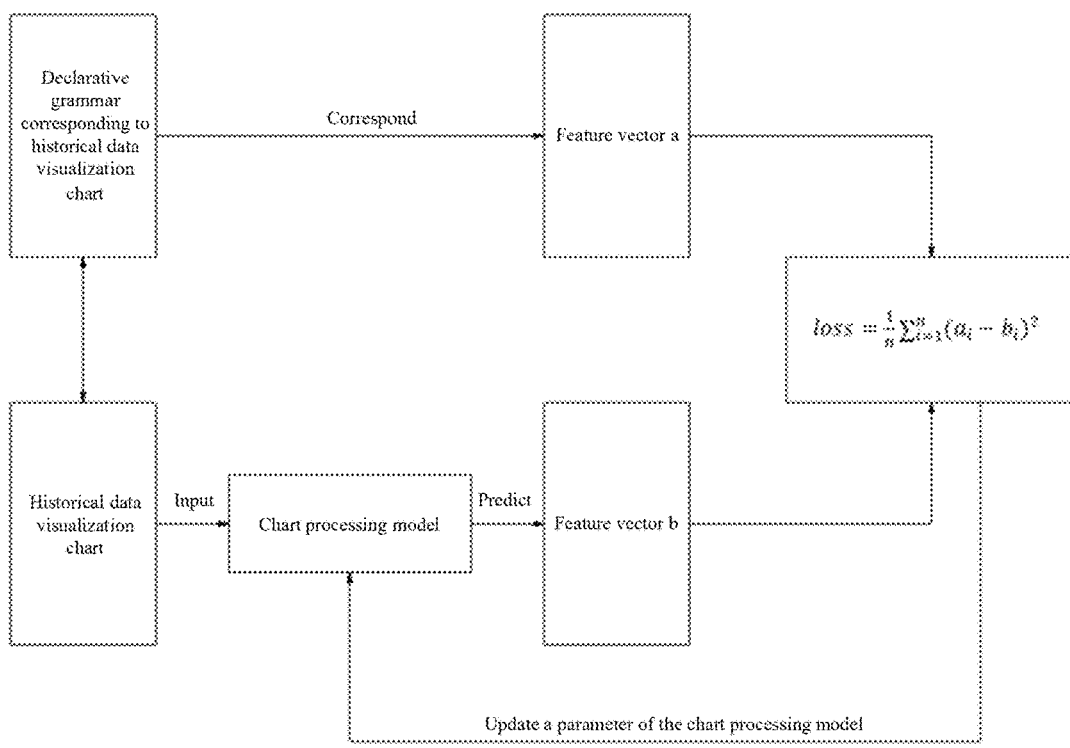
FIG. 5 is a schematic diagram of a training process of a chart processing model according to an embodiment of the present disclosure.

For the training process of the chart processing model, reference may be made to FIG. 5. FIG. 5 is a schematic diagram of a training process of a chart processing model according to an embodiment of the present disclosure.

As shown in FIG. 5, for the historical data visualization chart and the declarative grammar corresponding to the historical data visualization chart, the declarative grammar may correspond to one feature vector a, and the feature vector a is used as the label of the historical data visualization chart.

After the historical data visualization chart is inputted into the chart processing model, the chart processing model may predict a feature vector b for the historical data visualization chart.

A loss function is calculated based on the foregoing feature vector a and the feature vector b, and the parameter of the chart processing model is updated based on the loss function. The parameter of the chart processing model mentioned here may include a parameter of the foregoing network layer. In an example, the parameter of the chart processing model may also include a parameter of the pre-trained model.

The foregoing chart processing method provided in the embodiments of the present disclosure is described above. Next, a possible implementation of the embodiments of the present disclosure is described with reference to a specific scenario.

Figure 6:
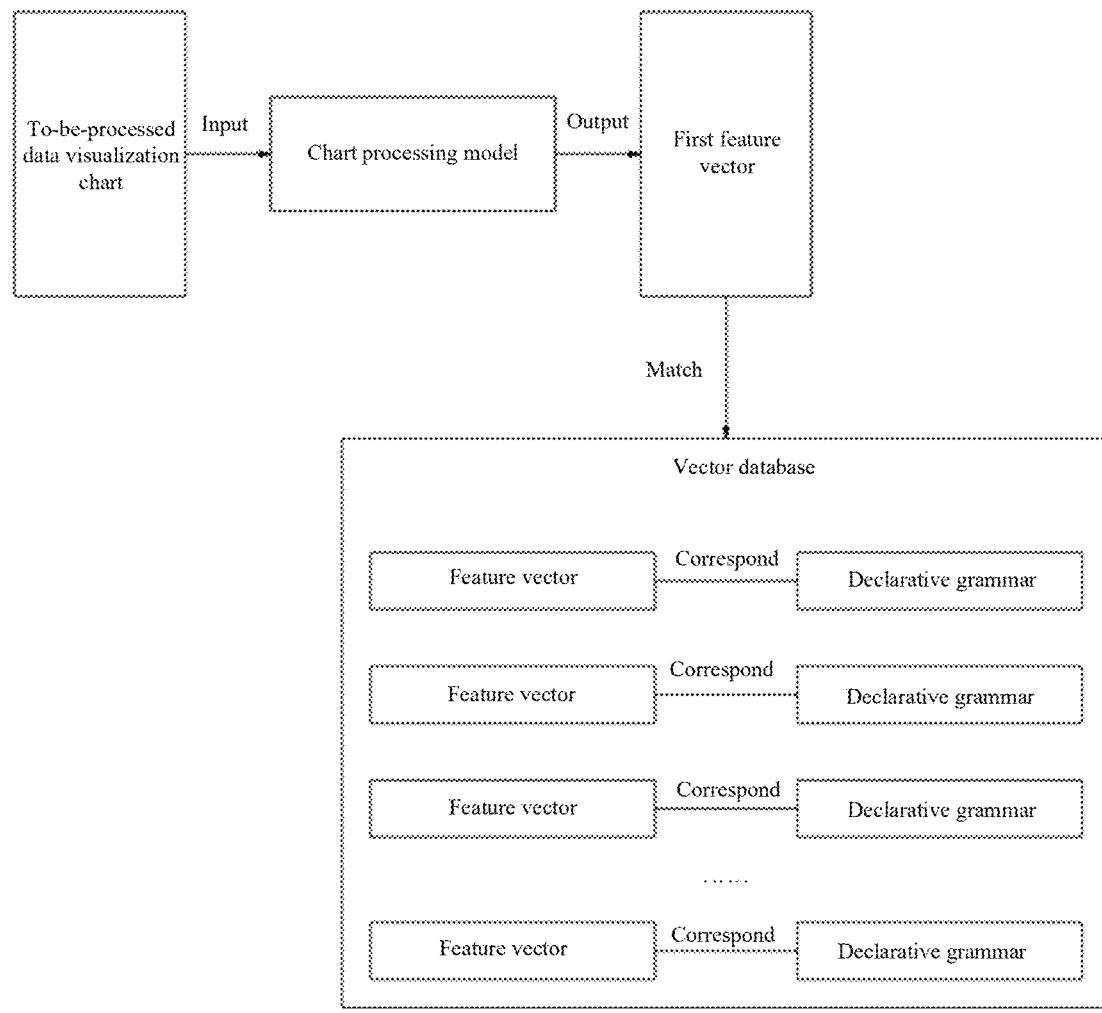
FIG. 6 is a schematic diagram of a chart processing method according to an embodiment of the present disclosure.

Referring to FIG. 6, FIG. 6 is a schematic diagram of a chart processing method according to an embodiment of the present disclosure. As shown in FIG. 6:

For the to-be-processed data visualization chart, the to-be-processed data visualization chart may be inputted into the chart processing model, and the chart processing model may output the first feature vector of the to-be-processed data visualization chart.

Then, the first feature vector is matched with the vector database. As shown in FIG. 6, the vector database includes feature vectors and declarative grammars stored in a corresponding manner.

Further, when the first feature vector matches a second feature vector in the vector database, the declarative grammar corresponding to the second feature vector is obtained from the vector database, and the declarative grammar corresponding to the second feature vector is determined as the declarative grammar corresponding to the to-be-processed data visualization chart. The first feature vector matching the second feature vector in the vector database may be that a matching degree between the first feature vector and the second feature vector is greater than a first threshold.

Based on the method provided in the foregoing embodiments, the embodiments of the present disclosure further provide an apparatus. The apparatus is described below with reference to the accompanying drawings.

Figure 7:
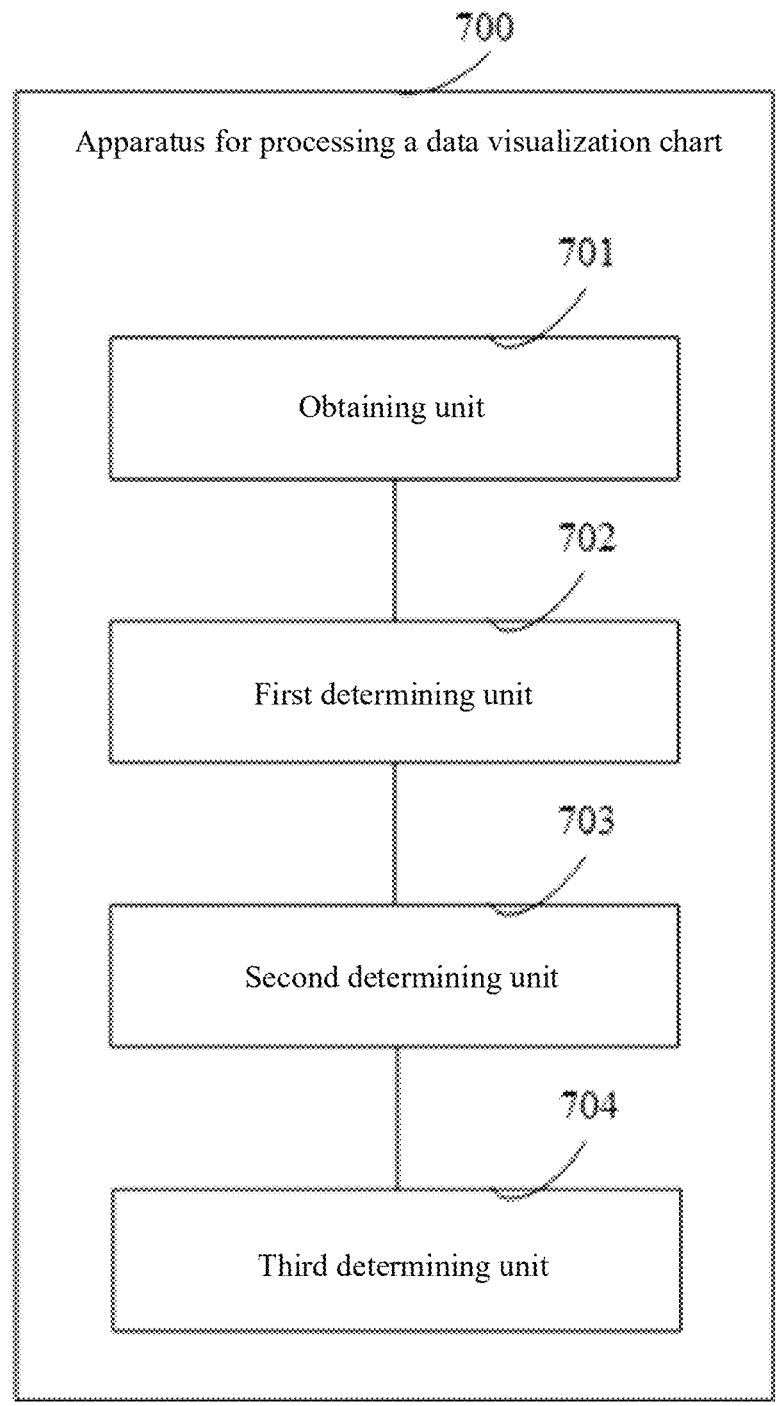
FIG. 7 is a schematic diagram of a structure of an apparatus for processing a data visualization chart according to an embodiment of the present disclosure.

Referring to FIG. 7, FIG. 7 is a schematic diagram of a structure of an apparatus for processing a data visualization chart according to an embodiment of the present disclosure. The apparatus 700 may specifically include, for example: an obtaining unit 701, a first determining unit 702, a second determining unit 703, and a third determining unit 704.

The obtaining unit 701 is configured to obtain a to-be-processed data visualization chart in a picture format;
the first determining unit 702 is configured to determine a first feature vector of the to-be-processed data visualization chart, the first feature vector being the same as a feature vector of a declarative grammar corresponding to the to-be-processed data visualization chart;
the second determining unit 703 is configured to determine, from a vector database, a second feature vector having a matching degree with the first feature vector greater than a first threshold, the vector database including: a plurality of feature vectors and a declarative grammar respectively corresponding to each of the plurality of feature vectors, the plurality of feature vectors including the second feature vector; and
the third determining unit 704 is configured to determine, based on the declarative grammar corresponding to the second feature vector in the vector database, a declarative grammar corresponding to the to-be-processed data visualization chart.

Optionally, the vector database is constructed by:
obtaining historical data visualization charts and a declarative grammar corresponding to each of the historical data visualization charts, the historical data visualization charts being in a picture format; and
performing the following operations for any one of the plurality of historical data visualization charts:
determining a feature vector of the declarative grammar corresponding to the historical data visualization chart; and
storing the declarative grammar corresponding to the historical data visualization chart and the feature vector of the declarative grammar corresponding to the historical data visualization chart in the vector database in a corresponding manner.

Optionally, the determining a feature vector of the declarative grammar corresponding to the historical data visualization chart includes:
extracting key information from the declarative grammar corresponding to the historical data visualization chart to obtain a simplified declarative grammar, the simplified declarative grammar being a structured declarative grammar; and
converting the simplified declarative grammar into a declarative grammar in a string format, and obtaining the feature vector of the declarative grammar corresponding to the historical data visualization chart based on the declarative grammar in the string format.

Optionally, the key information includes:
other information except for chart interaction information, the chart interaction information being information displayed in response to an interaction operation triggered for a data visualization chart.

Optionally, the first determining unit 702 is configured to:
input the to-be-processed data visualization chart into a chart processing model to obtain the first feature vector, in which the chart processing model is configured to determine, according to a data visualization chart that is input, a feature vector corresponding to the data visualization chart, and the chart processing model is obtained through training by:
performing the following operations for any one of the plurality of historical data visualization charts:
using a feature vector of a declarative grammar corresponding to the historical data visualization chart as a label of the historical data visualization chart, and training the chart processing model by using the historical data visualization chart and the label of the historical data visualization chart, in which the label of the historical data visualization chart is used to indicate the feature vector of the historical data visualization chart.

Optionally, the training the chart processing model by using the historical data visualization chart and the label of the historical data visualization chart includes:
fine-tuning a pre-trained model by using the historical data visualization chart and the label of the historical data visualization chart, in which the pre-trained model has a capability of understanding semantic connections between pictures and picture descriptions.

Optionally, the second determining unit 703 is configured to:
determine at least one second feature vector matching the first feature vector from the vector database; and
the determining, based on the declarative grammar corresponding to the second feature vector in the vector database, a declarative grammar corresponding to the to-be-processed data visualization chart includes:
determining, as the declarative grammar corresponding to the to-be-processed data visualization chart, a declarative grammar corresponding to a target feature vector in the vector database, in which the target feature vector is top N second feature vectors after the at least one second feature vector is sorted in a descending order of a matching degree with the first feature vector, and N is a positive integer.

Because the apparatus 700 is an apparatus corresponding to the method for processing a data visualization chart provided in the foregoing method embodiments, specific implementations of all the units of the apparatus 700 are the same concept as the foregoing method embodiments. Therefore, for specific implementations of all the units of the apparatus 700, reference may be made to the related description in the foregoing method embodiments, which will not be described in detail here.

An embodiment of the present disclosure further provides an electronic device, the electronic device including a processor and a memory, the processor is configured to execute instructions stored in the memory, to enable the device to perform the method for processing a data visualization chart provided in the foregoing method embodiments.

An embodiment of the present disclosure provides a computer-readable storage medium, including instructions, the instructions instructing a device to perform the method for processing a data visualization chart provided in the foregoing method embodiments.

An embodiment of the present disclosure further provides a computer program product which, when running on a computer, causes the computer to perform the method for processing a data visualization chart provided in the foregoing method embodiments.

Persons skilled in the art may easily think of other implementation solutions of the present disclosure after considering the specification and practicing the invention disclosed herein. The present disclosure is intended to cover any variations, uses, or adaptive changes of the present disclosure. These variations, uses, or adaptive changes follow the general principles of the present disclosure and include the common general knowledge or conventional technical means in the art that is not disclosed in the present disclosure. The specification and embodiments are merely considered as examples, and the true scope and spirit of the present disclosure are defined by the appended claims.

It should be understood that the present disclosure is not limited to the precise structures that have been described above and shown in the accompanying drawings, and various modifications and changes may be made without departing from the scope thereof. The scope of the present disclosure is only defined by the appended claims.

The foregoing descriptions are merely preferred embodiments of the present disclosure, and are not intended to limit the present disclosure. Any modification, equivalent replacement, or improvement made within the spirit and principle of the present disclosure shall fall within the scope of protection of the present disclosure.

The invention claimed is:

1. A method for processing a data visualization chart, comprising:
    obtaining a to-be-processed data visualization chart in a picture format;
    determining a first feature vector of the to-be-processed data visualization chart, wherein the first feature vector is same as a feature vector of a declarative grammar corresponding to the to-be-processed data visualization chart;
    determining, from a vector database, a second feature vector having a matching degree with the first feature vector greater than a first threshold, wherein the vector database comprises a plurality of feature vectors and a declarative grammar respectively corresponding to each of the plurality of feature vectors, the plurality of feature vectors comprises the second feature vector; and
    determining, based on a declarative grammar corresponding to the second feature vector in the vector database, the declarative grammar corresponding to the to-be-processed data visualization chart, wherein
    the vector database is constructed by:
        obtaining a plurality of historical data visualization charts and a declarative grammar corresponding to each of the plurality of historical data visualization charts, wherein the plurality of historical data visualization charts are in a picture format; and
        performing following operations for any one of the plurality of historical data visualization charts:
            determining a feature vector of the declarative grammar corresponding to the historical data visualization chart; and
            storing the declarative grammar corresponding to the historical data visualization chart and the feature vector of the declarative grammar corresponding to the historical data visualization chart in the vector database in a corresponding manner.

2. The method according to claim 1, wherein the determining a feature vector of the declarative grammar corresponding to the historical data visualization chart comprises:
    extracting key information from the declarative grammar corresponding to the historical data visualization chart to obtain a simplified declarative grammar, wherein the simplified declarative grammar is a structured declarative grammar; and
    converting the simplified declarative grammar into a declarative grammar in a string format, and obtaining the feature vector of the declarative grammar corresponding to the historical data visualization chart according to the declarative grammar in the string format.

3. The method according to claim 2, wherein the key information comprises:
    chart type information of the historical data visualization chart or chart data information of the historical data visualization chart.

4. The method according to claim 1, wherein the determining a first feature vector of the to-be-processed data visualization chart comprises:
    inputting the to-be-processed data visualization chart into a chart processing model to obtain the first feature vector, wherein the chart processing model is configured to determine, according to a data visualization chart that is input, a feature vector corresponding to the data visualization chart, and the chart processing model is obtained through training by:
    performing following operations for any one of the plurality of historical data visualization charts:
    using a feature vector of a declarative grammar corresponding to the historical data visualization chart as a label of the historical data visualization chart, and training the chart processing model by using the historical data visualization chart and the label of the historical data visualization chart, wherein, the label of the historical data visualization chart is used to indicate the feature vector of the historical data visualization chart.

5. The method according to claim 4, wherein the training the chart processing model by using the historical data visualization chart and the label of the historical data visualization chart comprises:
    fine-tuning a pre-trained model by using the historical data visualization chart and the label of the historical data visualization chart, wherein the pre-trained model has a capability of understanding semantic connections between pictures and picture descriptions.

6. The method according to claim 1, wherein the determining, from a vector database, a second feature vector having a matching degree with the first feature vector greater than a first threshold comprises:
  determining at least one second feature vector matching the first feature vector from the vector database; and
  the determining, based on a declarative grammar corresponding to the second feature vector in the vector database, the declarative grammar corresponding to the to-be-processed data visualization chart comprises:
  determining, as the declarative grammar corresponding to the to-be-processed data visualization chart, a declarative grammar corresponding to a target feature vector in the vector database, wherein, the target feature vector is top N second feature vectors after the at least one second feature vector is sorted in a descending order of a matching degree with the first feature vector, and N is a positive integer.

7. A non-transitory computer-readable storage medium, comprising instructions, wherein the instructions instruct a device to perform a method for processing a data visualization chart, and the method comprises:
  obtaining a to-be-processed data visualization chart in a picture format;
  determining a first feature vector of the to-be-processed data visualization chart, wherein the first feature vector is same as a feature vector of a declarative grammar corresponding to the to-be-processed data visualization chart;
  determining, from a vector database, a second feature vector having a matching degree with the first feature vector greater than a first threshold, wherein the vector database comprises a plurality of feature vectors and a declarative grammar respectively corresponding to each of the plurality of feature vectors, the plurality of feature vectors comprises the second feature vector; and
  determining, based on a declarative grammar corresponding to the second feature vector in the vector database, the declarative grammar corresponding to the to-be-processed data visualization chart, wherein
  the vector database is constructed by:
    obtaining a plurality of historical data visualization charts and a declarative grammar corresponding to each of the plurality of historical data visualization charts, wherein the plurality of historical data visualization charts are in a picture format; and
    performing following operations for any one of the plurality of historical data visualization charts:
      determining a feature vector of the declarative grammar corresponding to the historical data visualization chart; and
      storing the declarative grammar corresponding to the historical data visualization chart and the feature vector of the declarative grammar corresponding to the historical data visualization chart in the vector database in a corresponding manner.

8. The non-transitory computer-readable storage medium according to claim 7, wherein the determining a feature vector of the declarative grammar corresponding to the historical data visualization chart comprises:
  extracting key information from the declarative grammar corresponding to the historical data visualization chart to obtain a simplified declarative grammar, wherein the simplified declarative grammar is a structured declarative grammar; and
  converting the simplified declarative grammar into a declarative grammar in a string format, and obtaining the feature vector of the declarative grammar corresponding to the historical data visualization chart according to the declarative grammar in the string format.

9. The non-transitory computer-readable storage medium according to claim 8, wherein the key information comprises:
  chart type information of the historical data visualization chart or chart data information of the historical data visualization chart.

10. The non-transitory computer-readable storage medium according to claim 7, wherein the determining a first feature vector of the to-be-processed data visualization chart comprises:
  inputting the to-be-processed data visualization chart into a chart processing model to obtain the first feature vector, wherein the chart processing model is configured to determine, according to a data visualization chart that is input, a feature vector corresponding to the data visualization chart, and the chart processing model is obtained through training by:
  performing following operations for any one of the plurality of historical data visualization charts:
  using a feature vector of a declarative grammar corresponding to the historical data visualization chart as a label of the historical data visualization chart, and training the chart processing model by using the historical data visualization chart and the label of the historical data visualization chart, wherein, the label of the historical data visualization chart is used to indicate the feature vector of the historical data visualization chart.

11. The non-transitory computer-readable storage medium according to claim 10, wherein the training the chart processing model by using the historical data visualization chart and the label of the historical data visualization chart comprises:
  fine-tuning a pre-trained model by using the historical data visualization chart and the label of the historical data visualization chart, wherein the pre-trained model has a capability of understanding semantic connections between pictures and picture descriptions.

12. An electronic device, comprising a processor and a memory, wherein
  the processor is configured to execute instructions stored in the memory, to enable the electronic device to perform a method for processing a data visualization chart, and the method comprises:
  obtaining a to-be-processed data visualization chart in a picture format;
  determining a first feature vector of the to-be-processed data visualization chart, wherein the first feature vector is same as a feature vector of a declarative grammar corresponding to the to-be-processed data visualization chart;
  determining, from a vector database, a second feature vector having a matching degree with the first feature vector greater than a first threshold, wherein the vector database comprises a plurality of feature vectors and a declarative grammar respectively corresponding to each of the plurality of feature vectors, the plurality of feature vectors comprises the second feature vector; and
  determining, based on a declarative grammar corresponding to the second feature vector in the vector database, the declarative grammar corresponding to the to-be-processed data visualization chart, wherein
the vector database is constructed by:
obtaining a plurality of historical data visualization charts and a declarative grammar corresponding to each of the plurality of historical data visualization charts, wherein the plurality of historical data visualization charts are in a picture format; and
performing following operations for any one of the plurality of historical data visualization charts:
determining a feature vector of the declarative grammar corresponding to the historical data visualization chart; and
storing the declarative grammar corresponding to the historical data visualization chart and the feature vector of the declarative grammar corresponding to the historical data visualization chart in the vector database in a corresponding manner.

13. The electronic device according to claim 12, wherein the determining a feature vector of the declarative grammar corresponding to the historical data visualization chart comprises:
extracting key information from the declarative grammar corresponding to the historical data visualization chart to obtain a simplified declarative grammar, wherein the simplified declarative grammar is a structured declarative grammar; and
converting the simplified declarative grammar into a declarative grammar in a string format, and obtaining the feature vector of the declarative grammar corresponding to the historical data visualization chart according to the declarative grammar in the string format.

14. The electronic device according to claim 13, wherein the key information comprises:
chart type information of the historical data visualization chart or chart data information of the historical data visualization chart.

15. The electronic device according to claim 12, wherein the determining a first feature vector of the to-be-processed data visualization chart comprises:
inputting the to-be-processed data visualization chart into a chart processing model to obtain the first feature vector, wherein the chart processing model is configured to determine, according to a data visualization chart that is input, a feature vector corresponding to the data visualization chart, and the chart processing model is obtained through training by performing following operations for any one of the plurality of historical data visualization charts:
using a feature vector of a declarative grammar corresponding to the historical data visualization chart as a label of the historical data visualization chart, and training the chart processing model by using the historical data visualization chart and the label of the historical data visualization chart, wherein the label of the historical data visualization chart is used to indicate the feature vector of the historical data visualization chart.

16. The electronic device according to claim 15, wherein the training the chart processing model by using the historical data visualization chart and the label of the historical data visualization chart comprises:
fine-tuning a pre-trained model by using the historical data visualization chart and the label of the historical data visualization chart, wherein the pre-trained model has a capability of understanding semantic connections between pictures and picture descriptions.

17. The electronic device according to claim 12, wherein the determining, from a vector database, a second feature vector having a matching degree with the first feature vector greater than a first threshold comprises:
determining at least one second feature vector matching the first feature vector from the vector database; and
the determining, based on a declarative grammar corresponding to the second feature vector in the vector database, the declarative grammar corresponding to the to-be-processed data visualization chart comprises:
determining, as the declarative grammar corresponding to the to-be-processed data visualization chart, a declarative grammar corresponding to a target feature vector in the vector database, wherein, the target feature vector is top N second feature vectors after the at least one second feature vector is sorted in a descending order of a matching degree with the first feature vector, and N is a positive integer.

* * * * *